Figure 1:
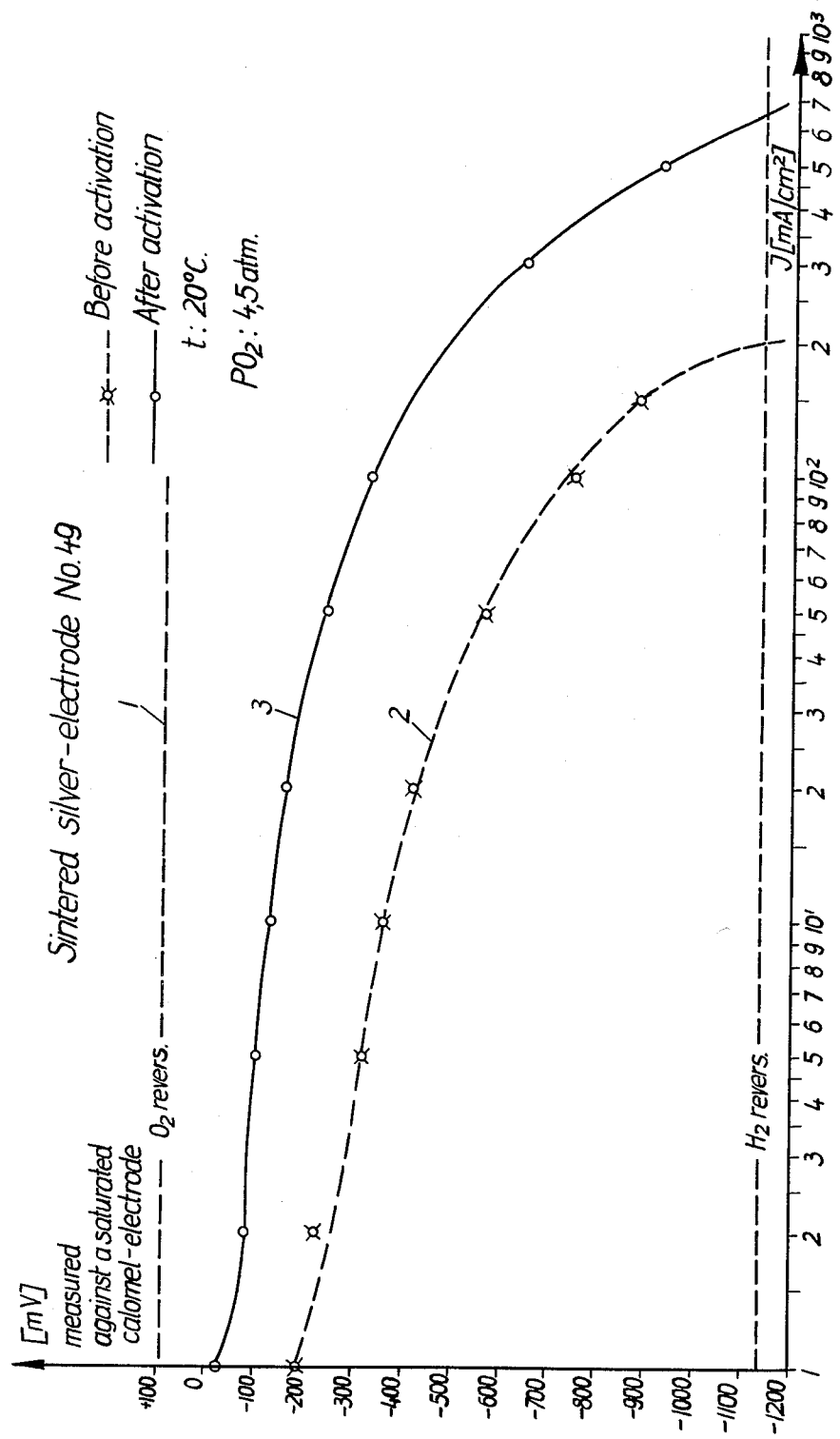

United States Patent Office 3,253,961
Patented May 31, 1966

3,253,961
METHOD OF ACTIVATING SILVER-CONTAINING ELECTRODES
Margarete Jung, Nieder-Eschbach, Taunus, Germany, and Hanns H. Kroeger, Schenectady, N.Y., assignors to Varta Aktiengesellschaft, Frankfurt am Main, Germany, a corporation of Germany
Filed Feb. 20, 1962, Ser. No. 174,496
Claims priority, application Germany, Feb. 23, 1961, A 36,781
19 Claims. (Cl. 136—120)

The present invention relates to a method of activating silver-containing electrodes for fuel cells, silver/zinc elements and the like which contain an active silver component. As known, the catalytically active silver component is either precipitated in finely distributed form on a carbon electrode body, or silver or Raney silver is formed into a sintered electrode body, the major portion of the sintered body consisting of inactive material, for instance, carbonyl nickel or silver powder.

However, such silver electrodes have the great disadvantage that their rest potential is considerably more negative than the reversible oxygen potential and decreases further when a load is connected thereto. Therefore, the available potential differential with the fuel electrode in the fuel cell is very small.

Furthermore, sintered Raney silver electrodes with a supporting skeleton or carbonyl nickel are highly corrosive and have little mechanical strength after activation of the electrode, i.e. after the catalytically inactive material has been leached therefrom in the conventional manner. In addition, the preparation and activation of these known silver electrodes is very time-consuming and, therefore, expensive.

It is the primary object of the present invention to avoid these disadvantages in the prior art silver electrode activation methods and to provide a simple and cheap electrode activation method.

This and other objects are accomplished in accordance with this invention by treating the electrode with a silver-activating solution containing compounds capable of forming soluble silver complex compounds.

Suitable substances capable of forming a complex compound with silver include aqueous solutions of ammonia, the alkali metal cyanides and rhodanides, particularly the sodium and potassium cyanides and rhodanides.

These may be used in any suitable solvent, for instance, water or alkali metal hydroxide solutions, such as potassium or sodium hydroxide solutions. It has been found that solutions of complex forming substances operate in water as good as in solutions of alkali metal hydroxides. The activating solutions may contain from about 0.1% to 20%, by weight of the solution, of the complex forming compound, a range of 0.5% to 2% being preferable.

In accordance with a preferred embodiment of the invention, the favorable effects of the treatment are further enhanced by adding an oxidizing agent to the treating solution. This oxidizing agent may be a 30% aqueous solution of hydrogen peroxide added to the solution, for instance, in amounts from about 0.05% to 10% and preferably between about 0.5% to about 5% by weight of the solution. Other oxygen-forming compounds as, for instance, alkali metal peroxides, alkali metal perborates (for instance, the sodium perborate of the formula $NaBO_3 \cdot H_2O_2 \cdot 3H_2O$), dibenzoic peroxide of the formula $(C_6H_5CO)_2O_2$, and alkali metal percarbonates, for instance, of the formula $$NaO-O-COONa +$$

1.5 $H_2O$ are suitable for this purpose. The simplest way of oxidation is to press air or oxygen into the solution, thereby simultaneously effecting vigorous mixing the treating solution.

The described electrode treatment may be effected, for instance, on a sintered electrode body produced in the following manner: 2 g. to 3 g. of dried silver sponge powder are uniformly distributed in a pressure mold and cylindrical electrode bodies of a diameter of about 20 mm. and a height of 1 mm. to 1.5 mm. are molded under a pressure of about 0.8 ton/sq. cm. of the electrode body surface. Molding is followed by a sintering process at about 500° C., which may be effected without or in a protective atmosphere, for instance, of hydrogen or a noble gas. Sintering takes about 10 minutes.

The activation of such an electrode will be described by way of illustation in the following examples without, however, being limited thereto.

Example 1

The electrode body is immersed for 1.5 minutes in a silver-activating solution of 4 N potassium hydroxide solution containing 10% of potassium cyanide and 0.65% of hydrogen peroxide, all percentages being based on the weight of the solution.

If the electrode is removed from the activating solution, it becomes dull, while the silver attains a grey-brownish color. It has been found that even keeping the electrode in the activating solution for an extremely short period of time will produce good results. For all practical purposes it is sufficient to dip the electrode once into the solution for a short period of time. There is no need to operate at elevated temperature, as the desired effect is achieved when dipping the electrode into the activating solution of a temperature between 15° C. and 20° C.

The activated electrode body is then placed into an electrode mounting and is used as oxidation electrode in a hydrogen fuel cell. At a load of 300 ma./sq. cm., the electrode shows a polarization of 300 mv. compared to the rest potential.

Example 2

The electrode body is fixed in an electrode mounting and is impregnated with a 5% solution of potassium cyanide in water. After three minutes, oxygen is pressed through the electrode body for one minute. The electrode is removed from the cyanide solution and the electrode body may be washed with water until free of cyanide.

In this case the silver electrode becomes slightly brownish, after removing it from the cyanide solution.

Surprisingly the electrode can be exposed to air for a long period of time, for instance, for 6 months, without requiring any protective measures and without showing a change in activity on subsequent use.

Used as an oxygen electrode in a hydrogen fuel cell, the cell is operated with a permanent load of 40 ma./sq. cm. for 5 months without any substantial increase in the polarizaiton of the electrode becoming noticeable.

Example 3

The silver electrode body is immersed in a 6% solution of potassium rhodanide in 6 N potassium hydroxide solution having a temperature of about 50° C. After immersion for ten minutes, the electrode is placed into an air current. It is not necessary to remove the activation solution by washing. Silver-containing electrodes treated with alkali metal rhodanide solution can be stored for a long period of time without loss in activity.

On using the thus treated electrode as described in Example 2, the same results are obtained.

FIG. 1 describes with the aid of a diagram the advantages obtainable by the activation in accordance with the invention. The horizontal line 1 relates to the reversible oxygen potential, measured opposite to a saturated calomel electrode. Curves 2 and 3 are plotted by connecting the values which were obtained by a not activated electrode of sintered silver powder (curve 1) and by the same electrode after activation as mentioned above (curve 2). The measurements were carried out in half-element-connection opposite to a nickel-sheet. The temperature was 20° C., the oxygen pressure was 4.5 atm.

At the start of the tests, adjustment of the final rest potential was first achieved. Thereafter, the silver electrode was negatively loaded, as shown in the diagram, and a reading of the potential, after its adjustment, was taken as soon as the new value did not change for 30 minutes. The curves 2 and 3 obtained in this manner show distinctly the increased capacity of the activated silver electrode, treated as described hereinabove in Example 3. It may be pointed out that the rest potential of the inactive silver electrode was finally reached after about 70 hours. In contrast thereto, the rest potential of the activated electrode was already reached after 4 minutes.

*Example 4*

50 parts, by weight, of chemically precipitated silver powder with an average particle size of $3-8\mu$ were intimately mixed with 50 parts, by weight, of carbonyl nickel with an average particle size of $5\mu$ and the mixture was uniformly distributed in a mold of a diameter of 15 cm.

Thereafter, the powder mixture was pressed to a height of 0.6 cm. under a pressure of 1.0 ton/sq. cm.

The resulting disk-shaped electrode was sintered for 6 minutes in a current of hydrogen at a temperature of 650° C. and then cooled in the same hydrogen atmosphere.

A 5% aqueous solution of ammonia was used as activating solution. As oxygen-delivering agent 0.6% of sodium percarbonate, calculated for the activating solution, were added thereto.

Figure 2:
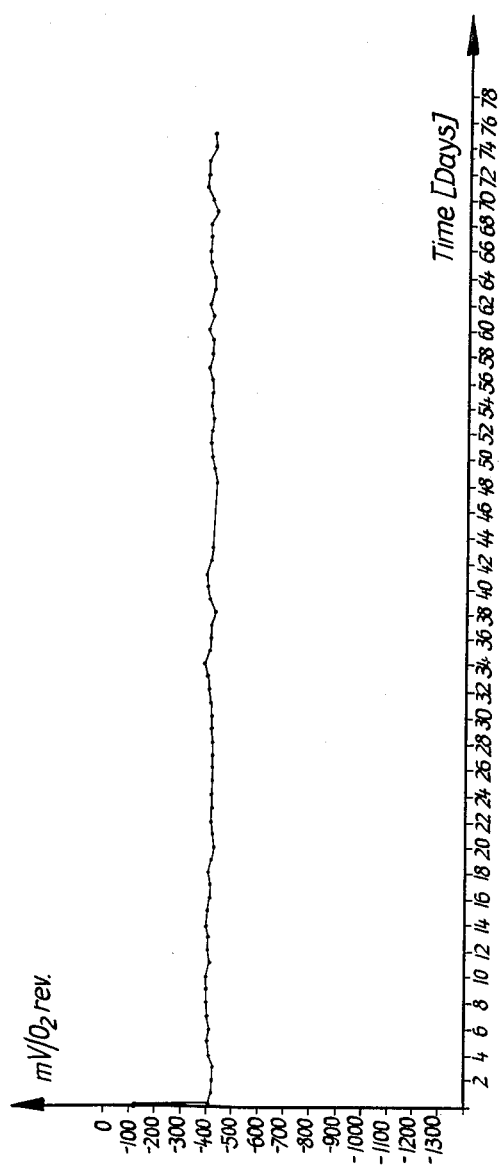

FIG. 2 shows a diagram illustrating an endurance test of an electrode produced according to the above mentioned method. As in Example 3 the potential was measured against a saturated calomel electrode (Hg/HgCy/saturated HgCl-solution/saturated KCl-solution). The electrode was permanently loaded with a current of 50 ma./sq. cm. During the test the temperature of the electrolyte (6 N potassium hydroxide solution) was kept at room temperature and oxygen was introduced under a pressure of 3 atm. The rest potential was reached after a few minutes. It decreased by 300 mv. due to the load. Although the test was continued for 75 days, the curve shows that the operating potential had hardly changed. The unimportant fluctuations in the curve are due to variations in the room temperature.

*Example 5*

Granulated activated carbon the particles of which had an approximate diameter of $800\mu$ was impregnated with a 10% silver nitrate solution, whereafter excess solution was removed. The silver nitrate in the pores of the carbon granules was reduced to metallic silver by the action of formic acid vapors. The silver-impregnated carbon granules were placed between 2 nickel sieves with perforations of a diameter of $300\mu$, whereby the permeability of the plane sieves amounted to 42%. After slightly pressing the grains into the screen, the sieve electrode was immersed into an activating solution containing 0.8 g. of sodium cyanide and 2 g. of sodium peroxide per 100 cc. of water. The immersion time amounted to 5 minutes, the temperature was between 18° C. and 20° C. Subsequently the electrode was removed from the activating solution, washed with water, and fixed in an electrode mounting.

In this case, too, as good results were obtained as with the electrode of Example 2, when operating the electrode with a load of 40 ma./sq. cm. in a fuel cell containing two moles of ethylene glycol in 1 l. of a 6 N potassium hydroxide solution.

*Example 6*

Double layer electrodes were also tested. The first layer of said electrode which is in contact with the oxygen of the air had a thickness of 5.5 mm., and was composed of 38%, by weight, of polyethylene and 62%, by weight, of activated carbon. The second layer had a thickness of 1.5 mm., and was composed of 35%, by weight, of polyethylene, 10%, by weight, of silver powder and 55%, by weight, of activated carbon. The particle size of all the materials used was below $60\mu$. The materials for either layer were mixed separately, whereafter the mixture for the silver-containing layer was filled into a mold, an electrically conducting net-work for the shunt was placed thereon, and the mixture composing the second layer was filled in the mold. The electrode layers were then pressed in the mold under a pressure of 450 kg./sq. cm. at a temperature of 160° C.

The resulting silver electrode was immersed with its hydrophilic silver-containing layer only into an activating solution containing 0.5%, by weight, of sodium cyanide and 1.5%, by weight, of sodium peroxide. The silver layer remained in the activating solution which had a temperature of 23° C. for about two minutes.

When used as fuel electrode, such a double layer electrode exhibited the same favorable properties as the electrodes of Examples 2 and 3.

Figure 3:
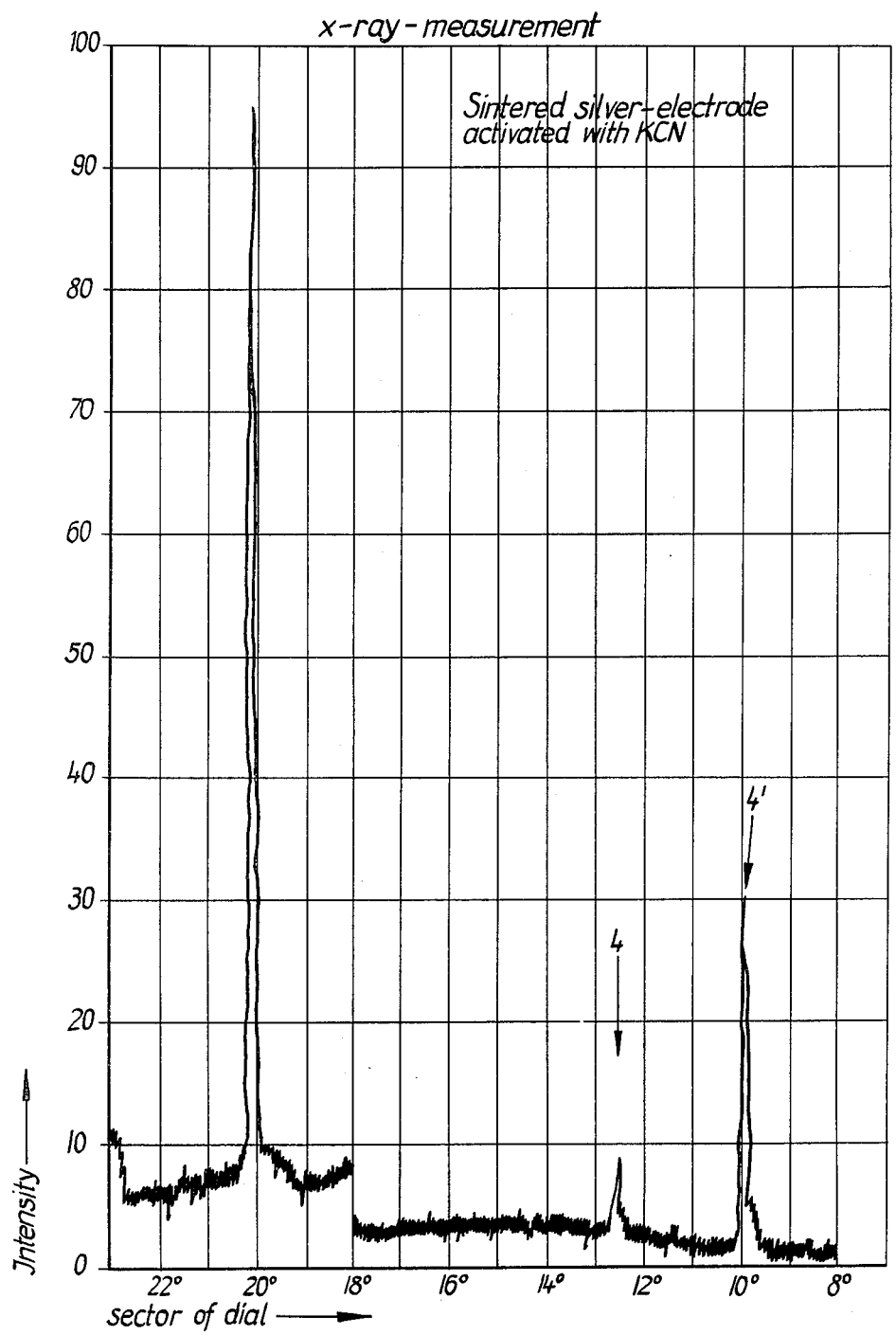

On testing silver-containing electrodes activated by means of an alkali metal cyanide solution, it was discovered that, as shown in FIG. 3, two heretofore not observed intensity peaks 4 and 4' appear in the X-ray absorption spectrum.

It is not yet clear, which chemical compound may be the cause of these peaks. It is, however, possible to determine, with the aid of an X-ray absorption spectrum comprising the sector between 8° and 14°, whether silver electrodes have been activated by means of an alkali metal cyanide solution.

As is evident from the examples, it is not necessary to press gaseous oxidizing agents into the activating solution. It is sufficient to dry the electrodes, after they have been treated with a silver complex-forming chemical compound, in the air or in a current of oxygen. When treating the electrodes with aqueous solutions of ammonia, it is of advantage to immerse the electrodes into the activating solution twice or three times, for one minute to three minutes each time, and to expose them to air between each immersion as well as thereafter.

The oxidizing agents which also comprise potassium persulfate $K_2S_2O_8$ are chosen in such a manner that the electrode material will not be attacked.

The time required for activation is dependent upon a number of factors, for instance, upon the kind of complex-forming substance, solvent and oxidizing agent, the quantity of complex-forming substance and oxidizing agent, the temperature at which the treatment is carried out, as well as the particle size of the silver. Optimum activating conditions can readily be predetermined by carrying out simple preliminary tests.

The process according to the present invention is particularly suitable for the treatment of silver electrodes to be used in fuel cells. It can also be applied with considerable advantage to silver electrodes to be employed for other purposes, for instance, for use in primary and secondary cells.

While the invention has been described in conjunction with certain preferred embodiments, it will be clearly understood that many variations and modifications may occur to those skilled in the art without departing from the spirit and scope of the invention as defined in the appended claims.

What is claimed is:

1. The process of catalytically activating a porous electrode comprising a matrix and an active component of silver which process comprises the steps of contacting the electrode with an aqueous solution of an alkali metal rhodanide and contacting the electrode during said activating treatment with an oxygen-containing gas.

2. The process according to claim 1, wherein the oxygen-containing gas is oxygen.

3. The process according to claim 1, wherein the oxygen-containing gas is air.

4. The process of catalytically activating a porous electrode comprising a matrix and an active component of silver which process comprises the step of contacting the electrode with an aqueous solution of an alkali metal cyanide and an oxidizing agent soluble in said solution.

5. The process of catalytically activating a porous electrode comprising a matrix and an active component of silver which process comprises the step of contacting the electrode with an aqueous solution of a sodium cyanide and an oxidizing agent soluble in said solution.

6. The process of catalytically activating a porous electrode comprising a matrix and an active component of silver which process comprises the step of contacting the electrode with an aqueous solution of a potassium cyanide and an oxidizing agent soluble in said solution.

7. The process of catalytically activating a porous electrode comprising a matrix and an active component of silver which process comprises the step of contacting the electrode with an aqueous solution of an alkali metal rhodanide and an oxidizing agent soluble in said solution.

8. The process of catalytically activating a porous electrode comprising a matrix and an active component of silver which process comprises the step of contacting the electrode with an aqueous solution of an alkali metal cyanide and an oxidizing agent selected from the group consisting of an alkali metal peroxide, and alkali metal percarbonate, an alkali metal perborate, and an alkali metal persulfate, said oxidizing agent being soluble in said solution.

9. The process of catalytically activating a porous electrode comprising a matrix and an active component of silver which process comprises the step of contacting the electrode with an aqueous solution of an alkali metal cyanide and contacting the electrode during said activating treatment with an oxygen-containing gas.

10. The process according to claim 9, wherein the oxygen-containing gas is oxygen.

11. The process according to claim 9, wherein the oxygen-containing gas is air.

12. The process of catalytically activating a porous electrode comprising a matrix and an active component of silver which process comprises the step of contacting the electrode with an aqueous solution of an alkali metal rhodanide and an oxidizing agent selected from the group consisting of an alkali metal peroxide, an alkali metal percarbonate, an alkali metal perborate, and an alkali metal persulfate, said oxidizing agent being soluble in said solution.

13. The process of claim 4 in which the solution contains hydrogen peroxide.

14. The process of claim 7 in which the solution contains hydrogen peroxide.

15. The process of claim 4 in which the solution contains sodium peroxide.

16. The process of claim 4 in which the amount of alkali metal cyanide ranges from about 1% to about 20% by weight.

17. The process of claim 7 in which the amount of alkali metal cyanide ranges from about 1% to about 20% by weight.

18. The process of claim 4, in which the electrode has a silver matrix.

19. The process of claim 7, in which the electrode has a silver matrix.

References Cited by the Examiner

UNITED STATES PATENTS

| | | | |
|---|---|---|---|
| 1,425,576 | 8/1922 | Clancy | 252—476 |
| 2,187,882 | 1/1940 | Law | 252—476 |
| 2,857,447 | 10/1958 | Lindstrom | 136—20 |
| 2,887,496 | 5/1959 | Montaqua et al. | 252—476 |
| 2,927,886 | 3/1960 | Allen et al. | 136—34 |
| 2,944,946 | 7/1960 | Lane et al. | 252—476 |

OTHER REFERENCES

Condensed Chemical Dictionary, 6th edition, Reinhold Co.

JOHN H. MACK, *Primary Examiner.*

JOHN R. SPECK, *Examiner.*